(12) United States Patent
Gupta et al.

(10) Patent No.: US 10,964,176 B2
(45) Date of Patent: Mar. 30, 2021

(54) SECURITY APPARATUS IN A SHOPPING ENVIRONMENT, AND A METHOD THEREOF

(71) Applicant: TOSHIBA TEC KABUSHIKI KAISHA, Tokyo (JP)

(72) Inventors: Rahul Gupta, Bangalore (IN); Kathiresan Selvaraj, Bangalore (IN)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/579,257

(22) Filed: Sep. 23, 2019

(65) Prior Publication Data

US 2021/0043048 A1  Feb. 11, 2021

(30) Foreign Application Priority Data

Aug. 8, 2019  (IN) .............................. 201941032223

(51) Int. Cl.
  *G07G 3/00* (2006.01)
  *G06K 9/00* (2006.01)
  *G06Q 20/20* (2012.01)

(52) U.S. Cl.
  CPC .......... *G07G 3/003* (2013.01); *G06K 9/00302* (2013.01); *G06K 9/00771* (2013.01); *G06Q 20/206* (2013.01); *G06Q 20/208* (2013.01)

(58) Field of Classification Search
  CPC .............. G07G 3/003; G06K 9/00302; G06K 9/00771; G06Q 20/206; G06Q 20/208
  USPC ......................................... 340/568.5, 568.25
  See application file for complete search history.

(56) References Cited

U.S. PATENT DOCUMENTS

| 9,092,951 B2* | 7/2015 | Kyle ..................... G08B 13/248 |
| 10,693,872 B1* | 6/2020 | Larson ................ H04L 63/0478 |
| 2003/0075602 A1* | 4/2003 | Wike, Jr. .............. G07G 1/0054 235/383 |
| 2003/0078849 A1* | 4/2003 | Snyder .................... A47F 9/047 705/23 |
| 2003/0120547 A1* | 6/2003 | Walter .................... A47F 9/046 705/16 |

(Continued)

OTHER PUBLICATIONS

"StopLift Checkout Vision Systems"—https://www.stoplift.com/solutions/scanitall-checkout-vision/2016, 3 pages—Retrieved on Sep. 23, 2019.

*Primary Examiner* — Omar Casillashernandez
(74) *Attorney, Agent, or Firm* — Foley & Lardner LLP

(57) ABSTRACT

A security apparatus and a method for detecting illegal carrying of items at a check-out are provided. The security apparatus includes a first set of sensors for measuring a number of parameters associated with a number of items purchased by a customer, and a second set of sensors to measure a number of physiological parameters of the customer. A communication unit in the security apparatus obtains information regarding a purchase of the number of items. A computing unit of the security apparatus compares reference parameters with the measured number of parameters. Based on a difference in the comparison, the computing unit receives the number of micro-expressions of the customer and determines one or more emotions of the customer. The one or more emotions and the number of parameters associated with the number of items are used to detect illegal carrying of at least one item.

19 Claims, 6 Drawing Sheets

(56) References Cited

U.S. PATENT DOCUMENTS

| | | | |
|---|---|---|---|
| 2005/0054935 A1* | 3/2005 | Rice | A61B 5/0261 |
| | | | 600/473 |
| 2005/0061870 A1* | 3/2005 | Stockton | G07G 1/0054 |
| | | | 235/380 |
| 2006/0243798 A1* | 11/2006 | Kundu | G06Q 20/4016 |
| | | | 235/383 |
| 2008/0134155 A1* | 6/2008 | Miller | G06F 9/4498 |
| | | | 717/139 |
| 2008/0249883 A1* | 10/2008 | Daily | A47F 9/047 |
| | | | 705/23 |
| 2019/0041984 A1* | 2/2019 | Lee | A61B 5/145 |
| 2019/0188513 A1* | 6/2019 | Beghtol | G06K 9/42 |
| 2020/0151696 A1* | 5/2020 | Plocher | G06Q 20/202 |

* cited by examiner

SECURITY APPARATUS IN A SHOPPING ENVIRONMENT, AND A METHOD THEREOF

TECHNICAL FIELD

The present disclosure relates to self-check-out in a shopping area. More particularly, but not specifically, the present disclosure relates to an apparatus and a method for securing and enabling easy self-check-out in a shopping area.

BACKGROUND

Self-check-out provisions are available for simple check-out procedures in many supermarkets or stores. Such self-check-out systems provide uniform billing procedures and hassle-free check-out for customers. A typical self-check-out system includes multiple lanes or stations having respective scanners and computers. The scanners may scan the items selected by the customers in the store, and the computer may bill the items. As such, the self-check-out system may replace some billing personnel or cashiers who manually check out items purchased by the customer and bills the items. Further, packing of the billed items may also be enabled in the self-check-out system.

In modern stores, updated self-check-out systems may enable customers to use their personal electronic devices (as well as provided devices in supermarkets or stores) to scan the items as and when the customers select the items from shelves or racks. An application in the electronic device generates a bill for the scanned items. The customer can also make the payment for the purchase of the items using the application. Thereafter, the customer may exit the store efficiently.

Many stores implementing self-check-out system have security personnel to manually check each customer exiting the store to confirm if self-check-out has been completed. Typically, the security personnel check the bill or receipt and compare the information therein with the goods/items carried by the customer. The security personnel may flag any customer if there is a discrepancy in the items carried by the customer. Manual checking of every customer is an inefficient process. Further, customer satisfaction is affected as every customer is checked for illegal carrying of items.

Thus, there is a need for efficient security in detecting theft/illegal carrying of items from a store.

SUMMARY

In an embodiment, the present disclosure relates to a security apparatus. The security apparatus may be used in a store implementing self-check-out. The security apparatus comprises a communication unit configured to receive information related to a purchase of a plurality of items by a customer. Further, the security apparatus comprises a first set of sensors configured to measure a plurality of parameters associated with the plurality of items. The security apparatus further comprises a second set of sensors configured to measure a plurality of physiological parameters of a customer. In an embodiment, the plurality of physiological parameters includes but are not limited to, a plurality of micro-expressions of the customer, temperature of the customer and heart rate of the customer. The security apparatus further comprises a computing unit. The computing unit is configured to receive the information related to the purchase of the plurality of items from the communication unit, and the plurality of parameters associated with the plurality of items from the first set of sensors. Further, the computing unit identifies a difference between the measurements of the plurality of parameters and reference parameters associated with the plurality of items. Thereafter, the computing unit receives measurements of the plurality of physiological parameters from the second set of sensors based on the identified difference. Using the measurements of the plurality of micro-expressions, the computing unit determines one or more emotions of the customer. Thereafter, the computing unit identifies illegal or otherwise improper carrying (e.g., shoplifting or theft) of at least one item based on the one or more emotions and the plurality of parameters associated with the plurality of items.

In an embodiment, the present disclosure relates to a method for securing check-out in a store. The method comprises receiving information related to a purchase of a plurality of items by a customer. Further, the method comprises measuring a plurality of parameters associated with the plurality of items. Furthermore, the method comprises identifying a difference between the measured plurality of parameters and reference parameters associated with the plurality of items. Thereafter, the method comprises measuring a plurality of micro-expressions of the customer based on the identified difference. Lastly, the method comprises determining one or more emotions of the customer using the plurality of micro-expressions. The one or more emotions and the plurality of parameters are used to identify illegal carrying of at least one item from the plurality of items.

The foregoing summary is illustrative only and is not intended to be in any way limiting. In addition to the illustrative aspects, embodiments, and features described above, further aspects, embodiments, and features will become apparent by reference to the drawings and the following

BRIEF DESCRIPTION OF THE ACCOMPANYING DRAWINGS

The novel features and characteristic of the disclosure are set forth in the appended claims. The disclosure itself, however, as well as a preferred mode of use, further objectives and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

Figure 1:
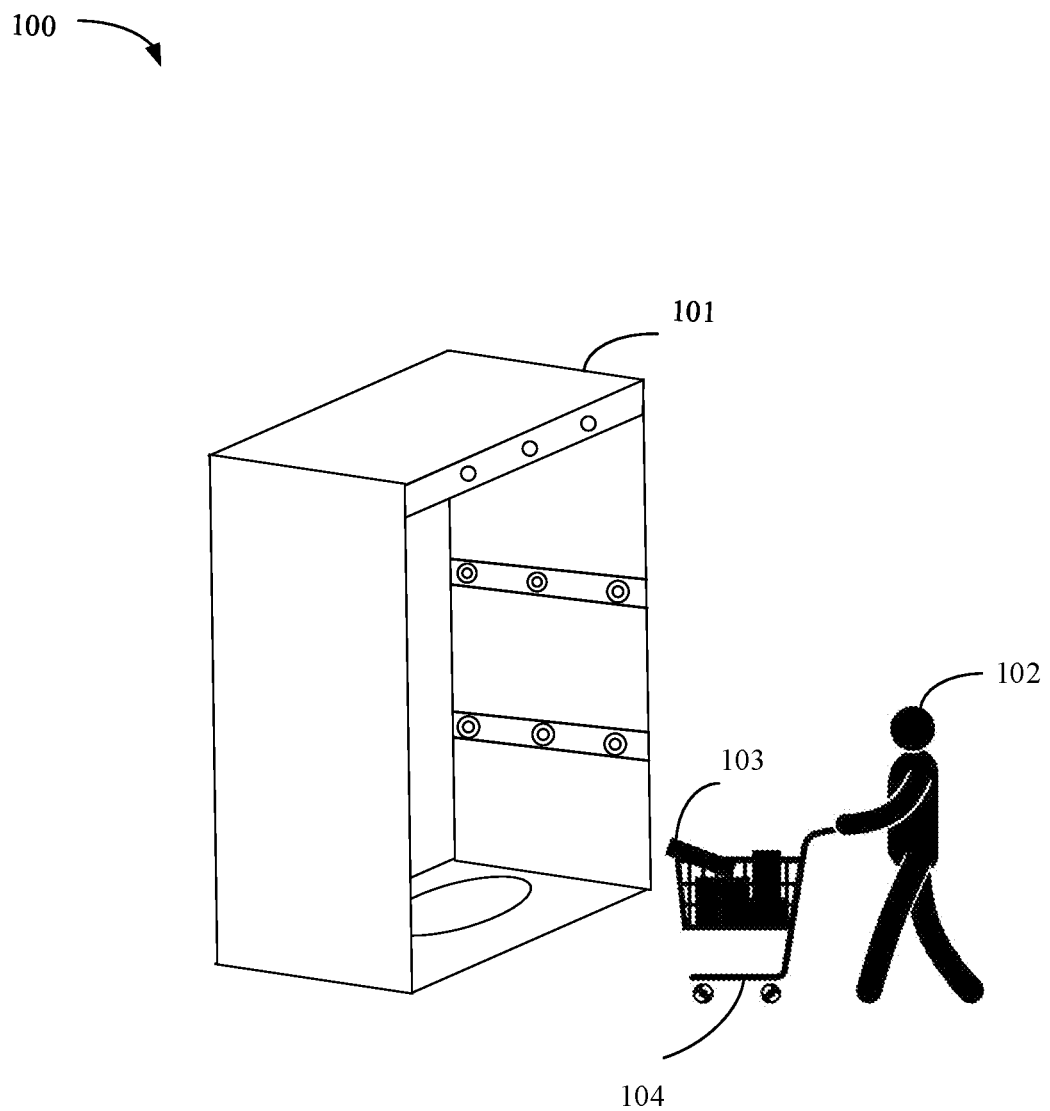
FIG. 1 is an illustration of a shopping environment, in accordance with an embodiment of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes, which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises," "comprising," or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Generally, in a shopping environment, such as self-check-out stores, customers may select and check out the items to be purchased using self-check-out systems. The self-check-out systems are automated systems that allow the customers to scan the items and bill the items. The self-check-out systems also allow customers to pack the items. However, a manual check is performed while exiting the store. The manual check is performed to ensure if the customers do not carry unbilled items and to prevent theft of items. The manual check may annoy loyal customers and the customers may have to stand in a queue. Thus, the existing security check performed while customers exit a store may be inconvenient to customers.

Embodiments of the present disclosure relate to a security apparatus and a method for detecting illegal carrying of items in a store. The security apparatus comprises a first set of sensors for measuring a plurality of parameters associated with a plurality of items purchased by a customer. The security apparatus further comprises a second set of sensors to measure a plurality of micro-expressions of the customer. Further, a communication unit, such as a network interface, is provided in the security apparatus to obtain information regarding a purchase of the plurality of items. A computing unit of the security apparatus retrieves reference parameters associated with the plurality of items using the information regarding the purchase. The reference information is compared with the measured plurality of parameters associated with the plurality of items. Based on a difference in the comparison, the computing unit receives the plurality of physiological parameters of the customer. In an embodiment, the plurality of parameters can include but not limited to a plurality of micro-expressions of the customer, a temperature of the customer, a heart rate of the customer and the like. The micro-expressions are used to determine one or more emotions of the customer. The one or more emotions and the plurality of parameters associated with the plurality of items are used to detect illegal (improper) carrying of at least one item. Thus, a standard and efficient security check is performed where the customers do not feel uncomfortable.

FIG. 1 is an illustration of customers exiting a shopping environment, in accordance with an embodiment of the present disclosure. FIG. 1 discloses a security apparatus (101), a customer (102), a cart (104) and a plurality of items (103) in the cart (104). In at least one embodiment, the shopping environment (100) is a store and may comprise a self-check-out system (not shown in FIG. 1) configured to enable self-check-out to customers. The self-check-out system may enable the customer (102) to scan the plurality of items (103) using electronic devices such as a mobile phone, a tablet, a Virtual Reality (VR) devices and the like, when selected from shelves/ racks. In one embodiment, the customer (103) may have placed the plurality of items (103) in the cart (104). A bill may be generated indicating total amount for purchasing the plurality of items (103). In an embodiment, the bill may be generated based on information present in a billing system (not shown in FIG. 1). The billing system may be a server associated with the application. After scanning the plurality of items (103), the billing system may retrieve information related to the plurality of items (103). For example, the retrieved information may include but not limited to, a weight of each item, a Maximum Retail Price (MRP) of each item, volume of each item, offers and the like. In one embodiment, the information related to the plurality of items may be stored in a database associated with billing system. In one embodiment, the database may be updated at defined intervals. In an embodiment, the billing system may generate the bill comprising at least a barcode or a QR code or characters comprising bill particulars. The bill may be printed or may be generated in the application installed in the electronic device associated with the customer (102).

In an embodiment, the self-check-out system may provision a packing unit, such as a packer, (not shown in FIG. 1) configured to pack the plurality of items. In one embodiment, the customer (102) may place the plurality of items on a platform and the packing unit may wrap the plurality of items. Thereafter, the customer (102) may pass through the security apparatus (101) along with the cart (104) before exiting the shopping environment (100). In one embodiment, the cart (104) can include but not limited to a trolley, a basket, a bag, or the like.

In an embodiment, the security apparatus (101) may be configured as a gate having a passage for the customer (102) to pass through before exiting the shopping environment (100). In an embodiment, the cart (104) may also be passed through the security apparatus (101). In an embodiment, the security apparatus (101) is used to detect illegal carrying of at least one item by the customer (102). Illegal carrying of an item may be defined as carrying an unbilled item, carrying wrongly billed items, and the like. In one embodiment, the security apparatus (101) may be movable or stationary.

Figure 2A:
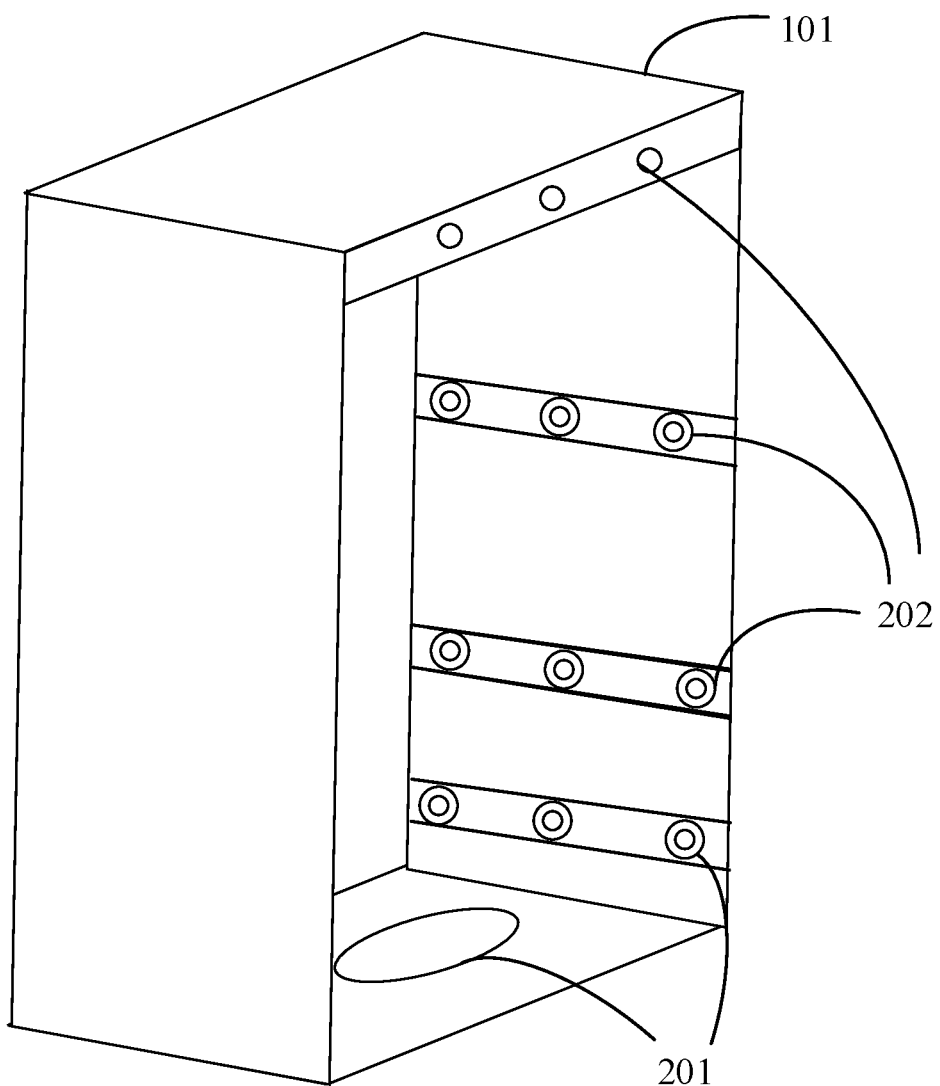
FIGS. 2A is an illustration of a security apparatus for detecting illegal carrying of items, in accordance with some embodiments of the present disclosure.

FIG. 2A is an illustration of an exemplary security apparatus for detecting illegal carrying of items. In an embodiment, the security apparatus (101) comprises a plurality of sensors, a communication unit (e.g., an interface, a transmitter, a receiver, or a combination thereof, not shown in FIG. 2A) and a computing unit (e.g., a processor, a computer, or the like, not shown in FIG. 2A). The plurality of sensors includes a first set of sensors (201) and as second set of sensors (202). The first set of sensors is may be used to measure a plurality of parameters associated with the plurality of items (103) and the second set of sensors may be used to measure a plurality of physiological parameters comprising at least a plurality of micro-expressions of the customer (102), heart rate of the customer (102), temperature of the customer (102). In a further embodiment, the plurality of physiological parameters are an effect of involuntary physiological changes in the customer (102). The first set of sensors comprises at least one of a weight sensor, an imaging unit (e.g., a camera or a scanner, or the like), and a temperature sensor. The second set of sensors comprises at least one of an imaging unit (e.g., a camera or an optical device) configured to capture the plurality of micro-expressions of the customer, a heart-rate sensor, and a thermal sensor. In an embodiment, the first set of sensors (201) and the second set of sensors (202) measure the plurality of parameters and the plurality of physiological parameters when the cart (104) and the customer (102) approach/ pass through the security apparatus (101) respectively.

The communication unit may be used to receive information related to the purchase of the plurality of items (103) from an electronic device associated with the customer. In a further embodiment, the application installed in the electronic device may automatically transmit the bill details to the communication unit of the security apparatus (101) when the customer (102) approaches the security apparatus (101). For example, in a Bluetooth enabled device, the bill may be shared with the security apparatus (101) when the customer is at a distance of 10 m. Likewise, in a Near Field Communication (NFC) enabled device, the customer (102) may bring the device close to the security apparatus (101) to share the bill. The device may be already paired with the security apparatus (101). For example, the pairing may be performed only once, and during subsequent visits to the shopping environment (100), the device may automatically connect to the security apparatus (101). In another embodiment, the communication unit may receive the information from a centralized billing system (for example a server). In an embodiment, the communication network may be one of a Wi-Fi, Bluetooth, Infrared (IR), and Local Area Network (LAN) unit that can receive the generated bill over a network. In a further embodiment, the communication unit may receive the information from the billing system, or the application installed in the electronic device associated with the customer (102). In another embodiment, the communication unit may be an optical scanner such as a barcode scanner/QR code scanner. The optical scanner may scan a barcode/QR code in the bill and retrieve the information related to the purchase of the plurality of items (103).

In an embodiment, reference parameters may be associated with the plurality of items (103). The reference parameters may include at least one of manufacturing details, packaging details, retail details and the like. For example, the reference parameters are weights associated with a loaf of bread, volume of an oil container, number of pieces of chocolate in a chocolate box and the like. The computing unit compares the reference parameters with the plurality of parameters associated with the plurality of items (103) measured by the first set of sensors (201). For example, consider a packed jar of honey weighing 500 grams. The reference parameter of the packed jar of honey is the known weight of 500 grams. The customer (102) may purchase the jar of honey using a self-check-out system or any other check-out system and a bill may be generated in a mobile device associated with the customer (102). Further, the customer (102) may carry the jar of honey in a basket and pass the basket through the security apparatus (101). A weight sensor installed in the security apparatus (101) weighs the basket and measures 800 grams. The computing unit receives the measured weight of the basket and simultaneously receives the bill details of the purchased items by the customer (102). Using the bill details, the computing unit determines that the customer (102) has purchased a jar of honey weighing 500 grams. The retrieved weight is compared against the measured weight. When a difference between the reference weight and the measured weight is identified, the computing unit flags the customer (102) or any other suitable person associated with the shop. In one embodiment, the imaging unit of the first set of sensors (201) may be used to detect items that are hidden inside or below a cart (104),. Likewise, the imaging unit may be suitably positioned in the security apparatus (101) to identify if the customer (102) is hiding any items.

In an embodiment, the second set of sensors (202) are used to measure a plurality of physiological parameters of the customer (102). In an embodiment, customer body temperature may be measured to determine illegal carrying of at least one item by the customer (102). For example, if the customer (102) is illegally carrying an item, the customer (102) may be nervous and the customer's body temperature may increase beyond a normal body temperature. The computing unit receives the plurality of micro-expressions from the second set of sensors (202) upon detecting the difference between the reference parameters and the measured plurality of parameters. In one embodiment, the micro-expressions are very brief, and usually last between $\frac{1}{15}$ and $\frac{1}{25}$ of a second. The plurality of micro-expressions often displays a concealed emotion and are the result of suppression or repression. In an embodiment, the face of a human can be evaluated to detect the plurality of micro-expressions. A few commonly detected micro-expressions are surprise, fear, disgust, anger, happiness, sadness, contempt, and the like. A person of ordinary skill in the art will appreciate that the micro-expressions can include other emotions apart from the above micro-expressions. The imaging unit is configured to capture a plurality of images of at least a customer's face for detecting the micro expressions. The plurality of micro-expressions may be measured by observing facial muscles using an imaging unit. The plurality of micro-expressions may be involuntary, and a person may not have control over the micro-expressions. In an embodiment, the imaging unit of the second set of sensors (202) may be used to capture a plurality of images and videos of the customer (102). The plurality of images and videos of the customer (102) may be processed by the computing unit to determine one or more emotions of the customer (102). In one embodiment, the computing unit may implement machine learning techniques to determine the one or more emotions of the customer (102).

Figure 2B:
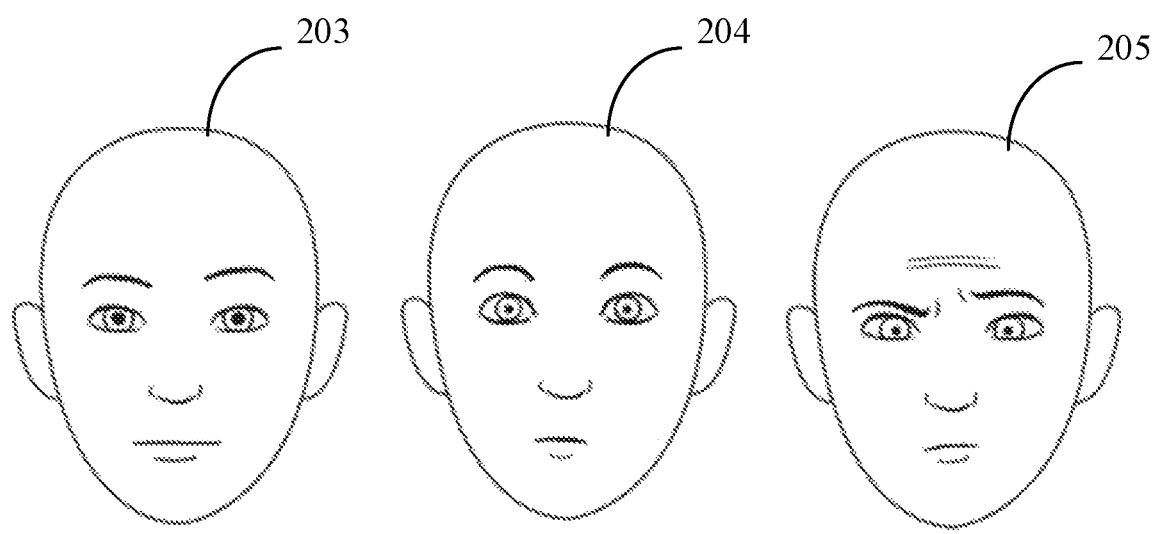
FIG. 2B illustrates various micro expressions, in accordance with some embodiments of the present disclosure.

In an embodiment, the plurality of micro-expressions is used to determine if the customer (102) is illegally carrying at least one item from the plurality of items (103). For example, if the determined micro-expression of a customer (102) is fear, then the computing unit determines that the customer (102) may be carrying an item illegally, hence the customer (102) is showing fear. FIG. 2B shows exemplary micro-expressions of a person. A micro-expression is the innate result of a voluntary and an involuntary emotional response occurring simultaneously and conflicting with one another. For illustrative purposes, the micro-expression (203) may indicate (such as a result of machine learning) a curious emotion expression (such as understood by a user). Similarly, the micro-expression (204) may indicate a surprised emotion expression, and the micro-expression (205) may indicates a puzzled emotion expression. Likewise, a plurality of micro-expressions of the customer (102) may be recorded and analyzed to determine emotion of the customer (102).

In an embodiment, an alerting module which may be implemented by a computing unit (not shown in FIG. 2A) may generate an alert upon detecting illegal carrying of at least one item from the plurality of items (103). The alert may include a notification over a network, a hooter (horn), light indications, or a combination thereof. In a further embodiment, the security apparatus (101) may indicate a security personnel about the detection of the illegal carrying of the at least one item.

Figure 3:
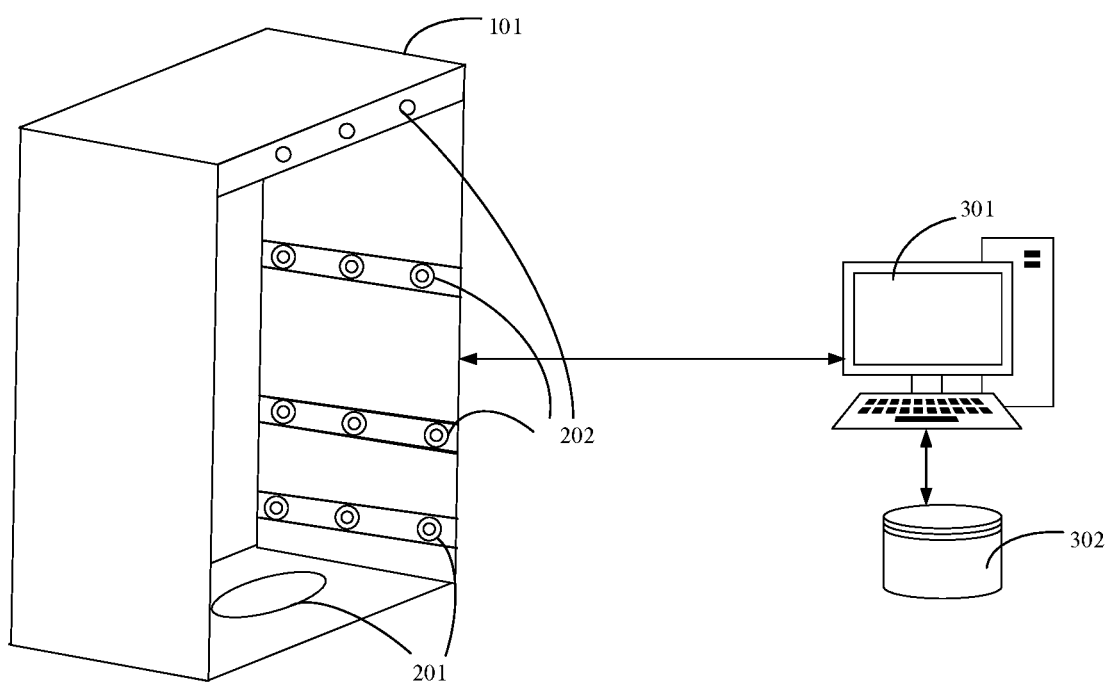
FIG. 3 is an illustration of a security apparatus in connection with a computing unit for detecting illegal carrying of items, in accordance with an embodiment of the present disclosure.

FIG. 3 is an illustration of a security apparatus in connection with a computing unit (computer) (301) for detecting illegal carrying of items, in accordance with an embodiment of the present disclosure. In an embodiment, the security apparatus (101) may be associated with the billing system (301). In an embodiment, the billing system may be a centralized computer system (which may include computing unit (301)) in the shopping environment (100) or a server associated with an application installed in electronic devices associated with customers. In case of centralized computer system, the customers may have to approach a common place for scanning and billing the items selected. Alternatively, customers may use electronic devices to scan the items selected and an application installed in the electronic device may bill for the selected items. The billing system (301) may be associated with the database (302) comprising information related to the plurality of items (103). The database (302) may be periodically updated. For example, when new items are received by a store, the database (302) may be updated with the details of the new items. Likewise, when the store provides new offers, the new offers are updated in the database (302). In an embodiment, the computing unit (302) may be used for analyzing customer patterns, and may use information such as a risk score of the customer. For example, the computing unit (301) may detect loyalty of each customer and store customer loyalty values for each customer based on historical purchases of each customer (a transaction history). The security apparatus (101) may access the computing unit (301) when the customer (102) approaches the security apparatus (101) to retrieve the loyalty values associated with the customer (102). Based on the loyalty values along with the determination of the one or more emotions and based on the plurality of parameters associated with the plurality of items (103) carried by the customer (102), the security apparatus (101) may determine if the customer (102) has illegally carried at least one item. The security apparatus may determine whether there is improper carrying based at least in part on historical transactions of the customer and a risk score associated with the customer, for example.

Figure 4:
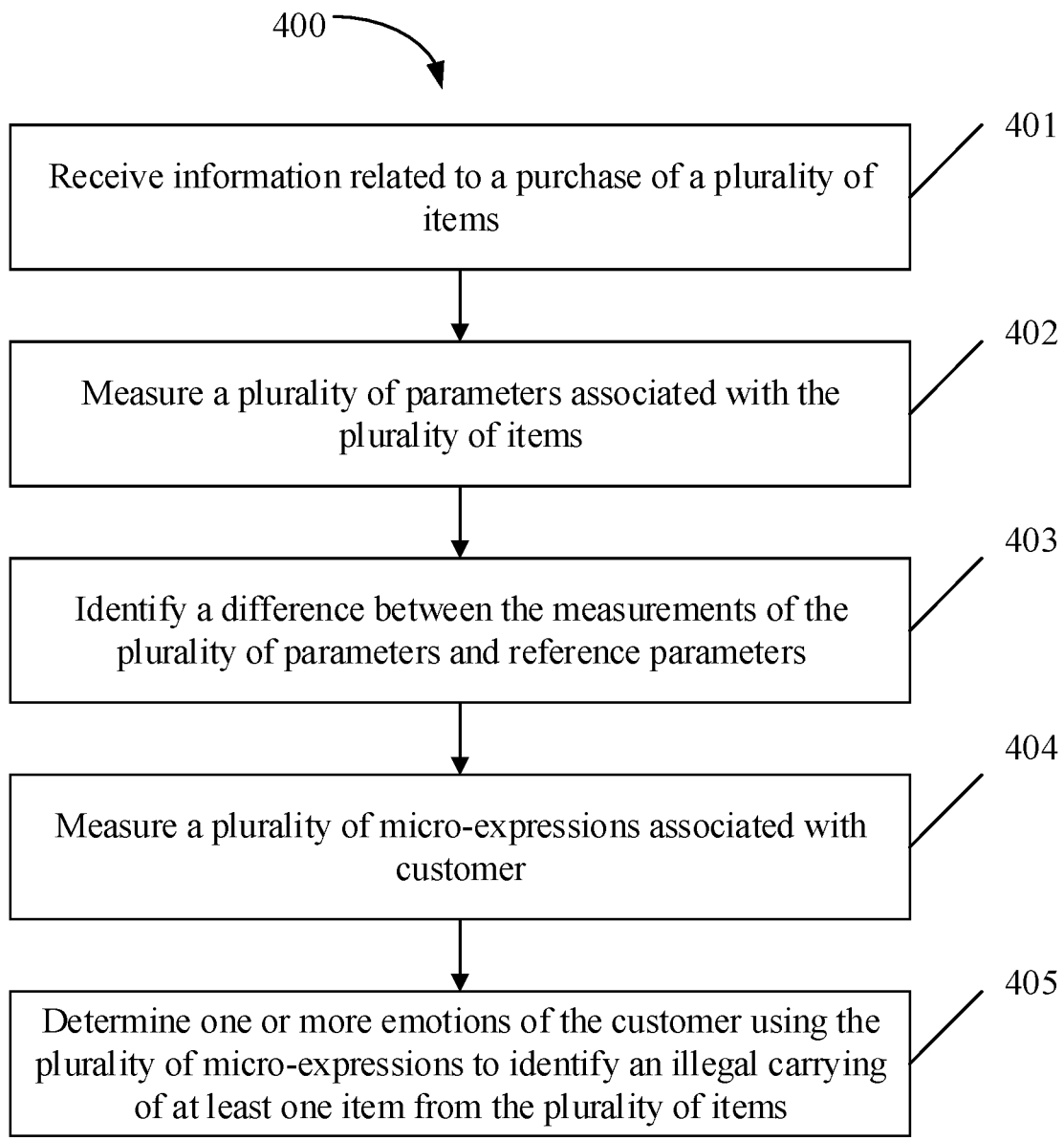
FIG. 4 illustrates an exemplary flowchart for detecting illegal carrying of items in a store, in accordance with some embodiments of the present disclosure.

FIG. 4 illustrates an exemplary flowchart for detecting illegal carrying of items in a store, in accordance with some embodiments of the present disclosure.

As illustrated in FIG. 4, the method (400) may comprise one or more steps. The method (400) may be described in the general context of computer executable instructions. Generally, computer executable instructions can include routines, programs, objects, components, data structures, procedures, modules, and functions, which perform particular functions or implement particular abstract data types.

The order in which the method (400) is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At step 401, the security apparatus receives information related to a purchase of a plurality of items (103). In an embodiment, the information related to the purchase of the plurality of items (103) is obtained from the database (302). In another embodiment, the information is received from the computing system (301) such as a billing system. In another embodiment, the user can scan the bill in the security apparatus (101). The information comprises at least a number of items purchased, weight of each item, quantity of each item, volume of each item, and the like. The information is received when the customer approaches the security apparatus (101) to pass through the security apparatus (101). The weight, volume, number of items, and the like are defined as reference parameters of the plurality of items (103).

At step 402, the security apparatus (101) measures a plurality of parameters of the plurality of items (103). The plurality of parameters of the plurality of items (103) includes at least a weight of the items, volume of the items, number of items, and the like. The plurality of parameters of the plurality of items (103) are measured when the cart (104) passes through the security apparatus (101). In an embodiment, the customer (102) and the cart (104) pass through the security apparatus (101) consecutively.

At step 403, the security apparatus (101) compares the reference parameters of the plurality of items (103) with the measured plurality of parameters. The comparison is performed to detect a mismatch in the billed items and the items carried in the cart (104). In an embodiment, a threshold is set for a difference in the comparison. For example, the threshold may be 100 grams. In an embodiment, the threshold may be a range, e.g., 100-200 grams. If a difference in the comparison exceeds the threshold, the security apparatus (101) generates an alert.

At step 404, the security apparatus (101) measures a plurality of physiological parameters of the customer (102) when the security apparatus generates the alert based on the difference. In an embodiment, one or more imaging units configured in the security apparatus (101) is used to capture the plurality of physiological parameters of the customer (102). The plurality of physiological parameters cannot be suppressed by the customer (102). In an example embodiment, the plurality of micro-expressions lasts for a very brief time (generally $\frac{1}{15}$ of a second). Examples of micro-expressions can include anger, fear, depression, anxiety, happiness, sadness, and the like. Likewise, in an exemplary embodiment, a heart rate of the customer (102) increases due to fear. This brief increase in heart rate may be used to identify illegal carrying of the one or more items (103).

At step 405, the security apparatus (101) determines one or more expressed emotions of the customer (102) using the plurality of micro-expressions. In an embodiment, artificial intelligence techniques can be used to determine the one or more emotions. For example, a Convolution Neural Network (CNN) can be used to train a machine-learning model and predict the one or more emotions of the customer (102). In an embodiment, the CNN may be provided with pre-defined spatial and temporal features of a customer's face during a training stage. Output(s) of the CNN may be compared with expected one or more emotions. Weights of the CNN may be adjusted based on the output(s) of the CNN to improve accuracy of the model. During an implementation stage, the security apparatus (101) captures the plurality of micro-expressions and predicts the one or more emotions of the customer (102) based on the training.

In an embodiment, if the predicted one or more emotions indicate that the customer (102) is likely to have illegally carried at least one item, the security apparatus (101) generates an alert. The alert can be an audial, visual, or an audio-visual alert. In an embodiment, the security apparatus (101) may notify a security personnel and generate a report comprising details regarding the illegal carrying the at least one item. The security personnel may check the report and may investigate the customer (102) based on findings in the report.

Figure 5:
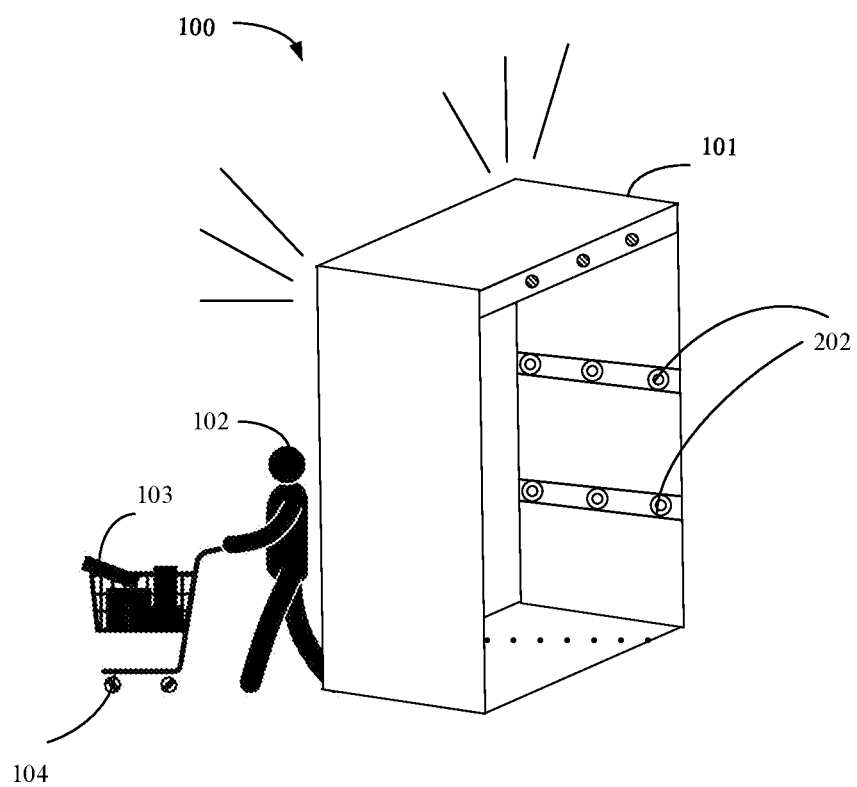
FIG. 5 illustrates an exemplary scenario of generating an alarm by a security apparatus, in accordance with an embodiment of the present disclosure.

FIG. 5 illustrates an exemplary scenario of generating an alert by the security apparatus (101). As shown in FIG. 5, the customer (102) exiting the security apparatus (101) is illustrated. Considering that the customer (102) has illegally carried an item, the security apparatus detects such illegal carrying of the item and generates the alert. For example, the security apparatus (101) may comprise a hooter for generating a sound alert. The security apparatus (101) may also comprise light units to indicate an alert. For example, a red light may blink in certain patterns or light up continuously to indicate an alert. The security apparatus (101) may also comprise a display unit showing a message. For example, messages such as "Warning" or "Alert" may be displayed on the display unit. Further, the security apparatus (101) may notify security personnel regarding the alert.

The present disclosure this provides a robust security apparatus and a method for securing a store while satisfying customer experience in the store. As the security apparatus (101) provides an automated approach to securing the store, the customers do not undergo rigorous manual checks.

The terms "an embodiment", "embodiment", "embodiments", "the embodiment", "the embodiments", "one or more embodiments", "some embodiments", and "one embodiment" mean "one or more (but not all) embodiments " unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments need not include the device itself.

The illustrated operations of FIG. 4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A security apparatus in a store, comprising:
   a communication unit configured to receive information related to a purchase of a plurality of items by a customer;
   a first set of sensors configured to measure a plurality of parameters associated with the plurality of items;
   a second set of sensors configured to measure a plurality of physiological parameters associated with the customer; and
   a computing unit configured to communicate with the communication unit, the first set of sensors and the second set of sensors, the computing unit being configured to:
   receive the information related to the purchase of the plurality items from the communication unit, and information relating to the plurality of parameters associated with the plurality of items from the first set of sensors;
   identify a difference between the measurements of the plurality of parameters and reference parameters associated with the plurality of items, wherein the reference parameters are determined using the information related to the purchase of the plurality of items;
   receive measurements of the plurality of physiological parameters from the second set of sensors in response to the identified difference; and
   determine one or more expressions of the customer using the plurality of physiological parameters, wherein the one or more expressions, historical transactions of the customer and a risk score associated with the customer, and the plurality of parameters associated with the plurality of items are used to facilitate detection of improper carrying of at least one item among the plurality of items.

2. The security apparatus of claim 1, wherein the first set of sensors comprises at least one of a weight sensor or a temperature sensor.

3. The security apparatus of claim 1, wherein the second set of sensors comprises at least one of an imaging unit, a heart-rate sensor, or a thermal sensor.

4. The security apparatus of claim 3, wherein the imaging unit is configured to capture a plurality of images of at least a face of the customer for detecting a plurality of the one or more expressions, wherein the one or more expressions are micro-expressions of the customer.

5. The security apparatus of claim 1, wherein the first set of sensors are configured to measure the plurality of parameters of the plurality of items placed in a cart when the cart passes through the security apparatus.

6. The security apparatus of claim 1, wherein the computing unit is configured to determine the reference parameters by retrieving the information from a database associated with the computing unit.

7. The security apparatus of claim 1, further comprises an alerting unit configured to generate an alert when the improper carrying of the at least one item is detected.

8. A method for securing check-out in a store, comprising:
receiving, by a security apparatus, information related to a purchase of a plurality of items by a customer;
measuring, by the security apparatus, a plurality of parameters associated with the plurality of items;
identifying, by the security apparatus, a difference between the measurements of the plurality of parameters and reference parameters associated with the plurality of items, wherein the reference parameters associated with the plurality of items are determined using the received information related to the purchase of the plurality of items;
measuring, by the security apparatus, a plurality of physiological parameters associated with the customer based on the determined difference;
determining, by the security apparatus, one or more expressions of the customer using the plurality of physiological parameters of the customer; and
determining whether the customer is improperly carrying at least one item among the plurality of items based on the one or more expressions, historical transactions of the customer and a risk score associated with the customer, and the plurality of parameters associated with the plurality of items.

9. The method of claim 8, wherein the plurality of items is placed in a cart, and wherein measuring the plurality of parameters associated with the plurality of items comprises passing the cart through the security apparatus.

10. The method of claim 8, wherein the reference parameters are determined by retrieving the information from a database associated with the security apparatus.

11. The method of claim 8, further comprising generating an alert upon detecting the improper carrying of the at least one item.

12. The method of claim 8, wherein the plurality of physiological parameters comprises at least a plurality of micro-expressions of the customer, a heart rate of the customer and a temperature of the customer.

13. A non-transitory computer-readable medium storing a program having instructions, which, when executed by a computer, causes the computer to perform operations comprising:
receiving information related to a purchase of a plurality of items, and receiving information relating to a plurality of parameters associated with the plurality of items from a first set of sensors;
identifying a difference between measurements of the plurality of parameters measured by the first set of sensors and reference parameters associated with the plurality of items, wherein the reference parameters are determined using the information related to the purchase of the plurality of items;
receiving measurements of a plurality of physiological parameters from a second set of sensors in response to the identified difference; and
determining one or more expressions of the customer using the plurality of physiological parameters, wherein the one or more expressions, historical transactions of the customer and a risk score associated with the customer, and the plurality of parameters associated with the plurality of items are used to detect improper carrying of at least one item among the plurality of items.

14. The non-transitory computer-readable medium of claim 13, wherein the first set of sensors comprises at least one of a weight sensor or a temperature sensor.

15. The non-transitory computer-readable medium of claim 13, wherein the second set of sensors comprises at least one of an imaging unit, a heart-rate sensor, or a thermal sensor.

16. The non-transitory computer-readable medium of claim 15, wherein the imaging unit is configured to capture a plurality of images of at least a face of the customer for detecting a plurality of micro-expressions.

17. The non-transitory computer-readable medium of claim 13, further comprising determining the reference parameters by retrieving the information from a database.

18. The security apparatus of claim 1, wherein the first set of sensors comprises an imaging unit configured to capture a plurality of images of at least one item among the plurality of items placed at a bottom of a cart.

19. The non-transitory computer-readable medium of claim 13, wherein the first set of sensors comprises an imaging unit configured to capture a plurality of images of at least one item among the plurality of items placed at a bottom of a cart.

* * * * *